(12) United States Patent
Grayson (10) Patent No.: US 10,795,550 B1
(45) Date of Patent: Oct. 6, 2020

(54) CONTEXT-SPECIFIC INTERPRETATION OF COMPUTER COMMANDS

(71) Applicant: INTUIT INC., Mountain View, CA (US)

(72) Inventor: David Grayson, Mountain View, CA (US)

(73) Assignee: INTUIT INC., Mountain View, CA (US)

(*) Notice: Subject to any disclaimer, the term of this patent is extended or adjusted under 35 U.S.C. 154(b) by 112 days.

(21) Appl. No.: 16/009,860

(22) Filed: Jun. 15, 2018

(51) Int. Cl.
  *G06F 3/0484* (2013.01)
  *G06F 9/451* (2018.01)
  *G06F 3/0481* (2013.01)
  *G06N 3/04* (2006.01)
  *G06N 3/08* (2006.01)

(52) U.S. Cl.
  CPC .......... *G06F 3/0484* (2013.01); *G06F 3/0481* (2013.01); *G06F 9/453* (2018.02); *G06N 3/04* (2013.01); *G06N 3/08* (2013.01)

(58) Field of Classification Search
  CPC ........ G06N 3/04; G06N 3/08; G06F 17/5009; G06F 9/455; G06F 13/105; G06F 11/3664
  See application file for complete search history.

(56) References Cited

U.S. PATENT DOCUMENTS

| | | | | |
|---|---|---|---|---|
| 6,523,027 | B1* | 2/2003 | Underwood | G06F 9/465 |
| 2006/0265232 | A1* | 11/2006 | Katariya | G06Q 30/016 |
| | | | | 705/304 |
| 2012/0078611 | A1* | 3/2012 | Soltani | G06F 3/167 |
| | | | | 704/9 |
| 2017/0330195 | A1* | 11/2017 | Lange | G06F 3/0486 |

* cited by examiner

*Primary Examiner* — Cao H Nguyen
(74) *Attorney, Agent, or Firm* — DLA Piper LLP (US)

(57) ABSTRACT

To provide context-specific interpretation of a user interaction with a user interface of a computer application, a processor may detect a user interaction with a user interface (UI). The processor may analyze the user interaction to determine a plurality of action details. The processor may generate a user context based on the plurality of action details and additional context information. The processor may select at least one operation relevant to the user interaction and context. The processor may cause the computer application to perform the operation.

31 Claims, 8 Drawing Sheets

CONTEXT-SPECIFIC INTERPRETATION OF COMPUTER COMMANDS

DETAILED DESCRIPTION OF SEVERAL EMBODIMENTS

Many computer applications may allow users to carry out numerous disparate tasks, and consequently may have complicated user interfaces and a high incidence of self-help events. Embodiments described herein may be configured to determine a context of a user's interaction with an application in real time as the user works in the application. Based on the interaction and the context, machine learning-based recommender systems may automatically cause the computer to take an action. Such action may be, for example, to generate help suggestions that may be relevant to the user. For example, some embodiments may encode context in the form of a low-dimensional numerical vector (e.g., an embedding). This vector may be constructed from the user's recent clickstream data and may provide a set of machine-interpretable features that may reconstruct a user's recent context. These embeddings may be useful for training models to perform complex prediction tasks that may leverage an understanding of user intent of a user interaction with the computer. Such an understanding may enable recommending help articles to users through various self-help portals.

For example, some embodiments may generate an unsupervised, distributed representation of a user's intent by tracking the user's path through an application that contains numerous disparate content types. Embodiments may be fast to train, may require no metadata about page content, may integrate easily with other static features and other predictive models, and/or may be fast to recall during deployment owing to simple runtime operations (e.g., dictionary lookups and numerical averaging) as described in detail below.

Although the explanation below relates to a computer automatically recommending help articles to user through various self-help portals, the concepts described herein may be applied to interpret any interaction with a computer application. For instance, online retail applications may use the concepts described herein to improve automated suggestions for other product purchases by incorporating recent user interaction with the application. In addition, the concepts described herein may be used to modify the search results within any application that requires searching over a content database, for example by using the user's in-product activity to generate additional features that augment the search algorithm's other input features.

Figure 1:
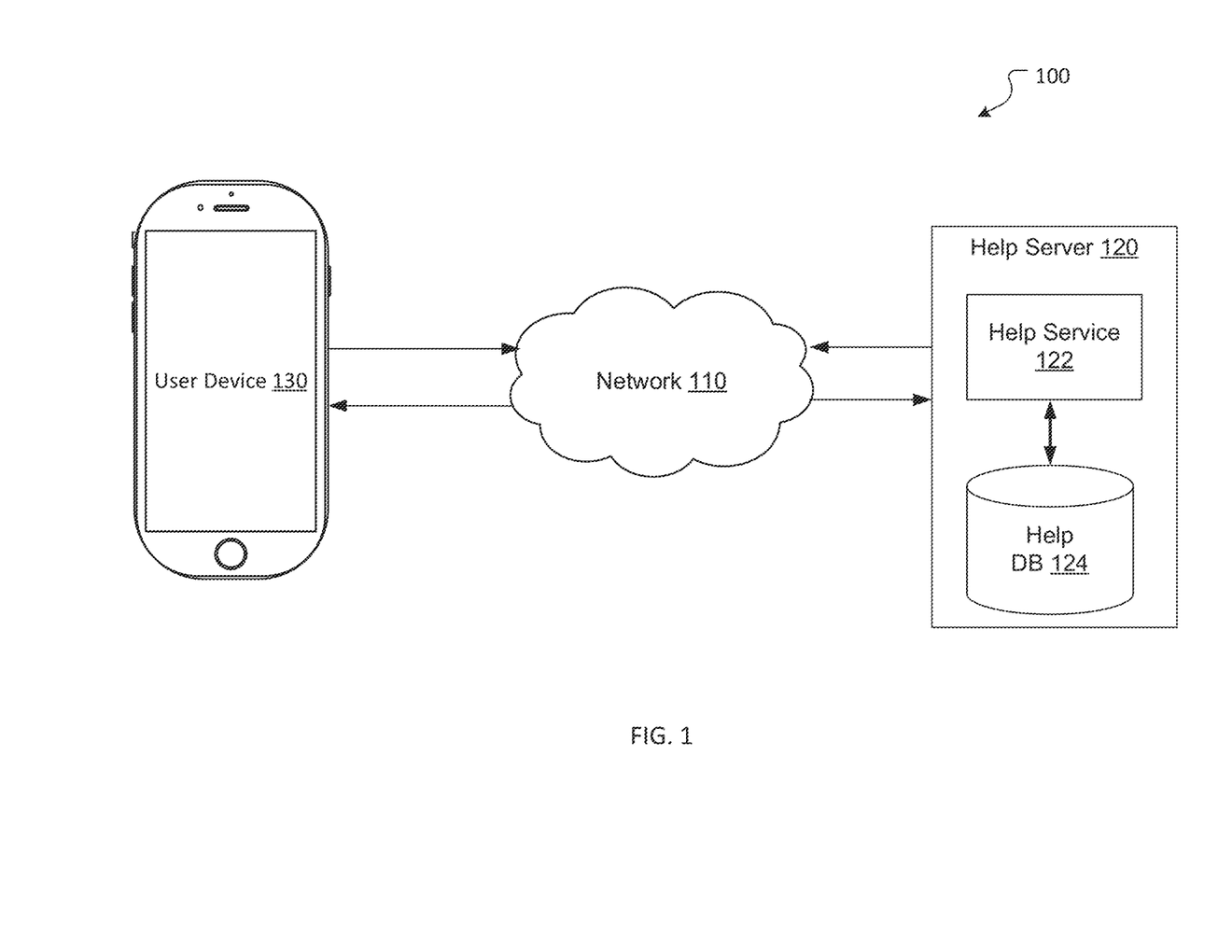
FIG. 1 shows a system configured to provide context-specific interpretation of computer commands according to an embodiment of the present disclosure.

FIG. 1 shows a system 100 configured to provide context-specific help according to an embodiment of the present disclosure. System 100 may include help server 120 and/or user device 130. Network 110 may be the Internet and/or other public or private networks or combinations thereof. Help server 120 and user device 130 may be configured to communicate with one another through network 110. For example, communication between the elements may be facilitated by one or more application programming interfaces (APIs). APIs of system 100 may be proprietary and/or may be examples available to those of ordinary skill in the art such as Amazon® Web Services (AWS) APIs or the like.

For example, user device 130 may access a remotely hosted application through network 110. One example of such an application is QuickBooks® Online, although virtually any application may be network-accessible, as those of ordinary skill in the art will appreciate. Alternatively, the application may be hosted on user device 130. Help server 120 may be configured to host the application and/or to provide context-specific help with the application. Help server 120 may include help service 122, which may be configured to collect and process user interaction data to determine context, and help database 124, which may be configured to store the collected data, the outcome of the processing by help service 122, and/or help suggestions for presentation to the user. Detailed examples of the operation of help service 122 are provided below.

User device 130 may be any device configured to provide access to remote application. For example, user device 130 may be a smartphone, personal computer, tablet, laptop computer, or other device. In some embodiments, user device 130 may send data (e.g., data input by a user navigating a user interface associated with the application) to help service 122, and/or help service 122 may capture the data sent by user device 130 to other portions of help server 120 and/or other server(s) in communication with help server 120 (not shown). User device 130 may also display context-specific help generated by and sent from help server 120 as disclosed herein.

Context-specific help may be provided locally within user device 130 and/or from help service 122 through network 110, in different embodiments. For example, context-specific help may be provided locally in cases where user device 130 executes an application locally using a local processor and memory. In this situation, user device 130 may perform processing attributed to help service 122 in the disclosed examples. Accordingly, while help server 120 is described throughout the specification, those of ordinary skill in the art will appreciate that user device 130 may be substituted for help server 120 to perform similar processing and provide similar functionality in embodiments wherein the application, and thus the context, are local to user device 130.

Help server 120 and user device 130 are each depicted as single devices for ease of illustration, but those of ordinary skill in the art will appreciate that help server 120 and/or user device 130 may be embodied in different forms for different implementations. For example, help server 120 may include a plurality of devices. In another example, a plurality of user devices 130 may communicate with help server 120. A single user may have multiple user devices 130, and/or there may be multiple users each having their own user device(s) 130.

Figure 2:
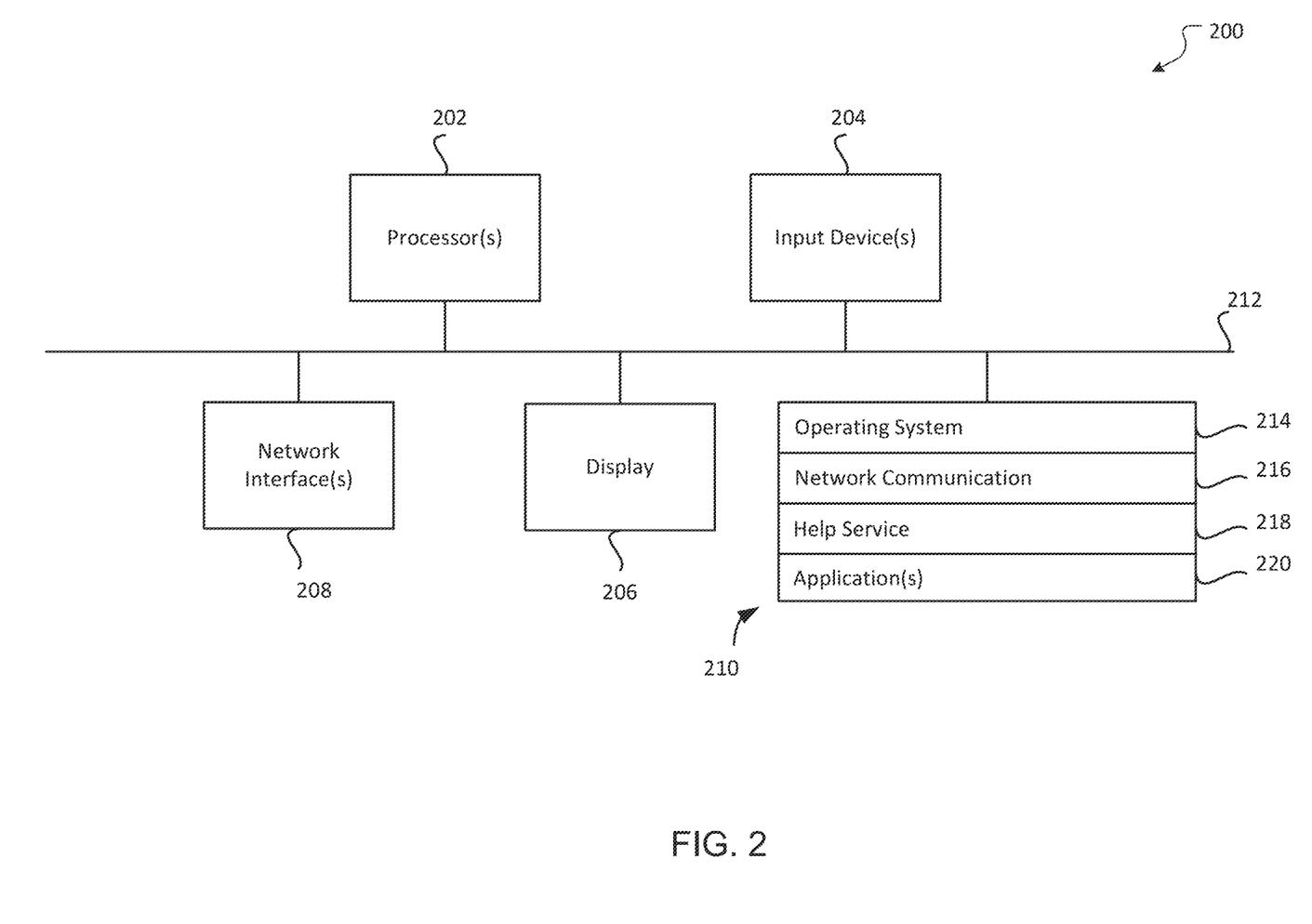
FIG. 2 shows a server device according to an embodiment of the present disclosure.

FIG. 2 is a block diagram of an example computing device that may implement various features and processes as described herein. For example, computing device 200 may function as help server 120 in some embodiments, such as when help is being provided to user device 130 through network 110. In other embodiments, such as when user device 130 is configured to provide help locally (e.g., without input from remote devices), computing device 200 may function as user device 130. Computing device 200 may be implemented on any electronic device that runs software applications derived from instructions, including without limitation personal computers, servers, smart phones, media players, electronic tablets, game consoles, email devices, etc. In some implementations, computing device 200 may include one or more processors 202, one or more input devices 204, one or more display devices 206, one or more network interfaces 208, and one or more computer-readable mediums 210. Each of these components may be coupled by bus 212.

Display device 206 may be any known display technology, including but not limited to display devices using Liquid Crystal Display (LCD) or Light Emitting Diode (LED) technology. Processor(s) 202 may use any known processor technology, including but not limited to graphics processors and multi-core processors. Input device 204 may be any known input device technology, including but not limited to a keyboard (including a virtual keyboard), mouse, track ball, and touch-sensitive pad or display. Bus 212 may be any known internal or external bus technology, including but not limited to ISA, EISA, PCI, PCI Express, NuBus, USB, Serial ATA or FireWire. Computer-readable medium 210 may be any medium that participates in providing instructions to processor(s) 202 for execution, including without limitation, non-volatile storage media (e.g., optical disks, magnetic disks, flash drives, etc.), or volatile media (e.g., SDRAM, ROM, etc.).

Computer-readable medium 210 may include various instructions 214 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 204; sending output to display device 206; keeping track of files and directories on computer-readable medium 210; controlling peripheral devices (e.g., disk drives, printers, etc.) which can be controlled directly or through an I/O controller; and managing traffic on bus 212. Network communications instructions 216 may establish and maintain network connections (e.g., software for implementing communication protocols, such as TCP/IP, HTTP, Ethernet, telephony, etc.).

Help service instructions 218 may include instructions that track user actions, process the user actions to determine context, and deliver context-specific help as described herein.

Application(s) 220 may be an application that uses or implements the processes described herein and/or other processes. The processes may also be implemented in operating system 214.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

FIGS. 3-7C illustrate processes for determining context, determining appropriate help for the context, and/or delivering context-specific help. In the following examples, some actions are described as being performed by help service 122. However, in some embodiments (e.g., for offline applications), some or all of the actions performed by help service 122 may be performed by user device 130.

Figure 3:
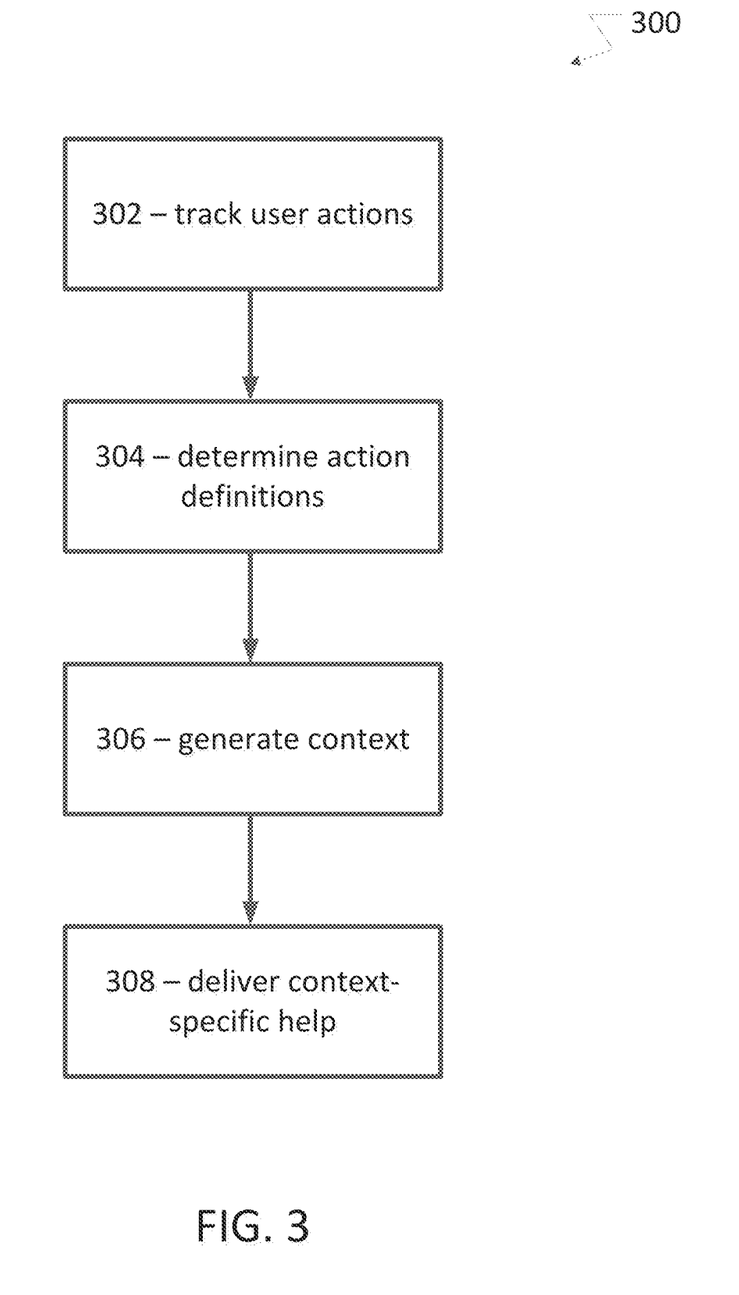
FIG. 3 shows a help delivery process according to an embodiment of the present disclosure.

FIG. 3 shows a help delivery process 300 according to an embodiment of the present disclosure. System 100 may perform process 300 to determine a context and present help that may be relevant to the determined context. In some embodiments, process 300 may be an overall process for delivering context-specific help, and the processes and features described in FIGS. 4-7C may be elements of process 300.

At 302, system 100 may detect and/or track one or more actions performed by a user. For example, help service 122 may record user interactions with an application made through a user interface (UI). User interactions may include clicks, entries into fields, hovers, highlights, and/or other selections of UI elements.

At 304, system 100 may determine action definitions for the actions detected at 302. For example, help service 122 may identify beacons corresponding to actions performed by the user. A beacon may include a string of data representing details of the action. Examples of beacon data may include an action type, action details, an area of a UI page where the action took place, and/or a URL or application section being visited when the action occurred. The beacon may be time stamped. Help service 122 may store beacons in help database 124 as they are captured. For example, help service 122 may store the beacons in a temporally-ordered list of strings, where each string is a separate beacon. Example beacon features and beacon processing are described with respect to FIGS. 4-5B below.

At 306, system 100 may generate a context for the user's interactions with the application. For example, help service 122 may access a plurality of precomputed embeddings describing possible beacons in help database 124. Help service 122 may use the embeddings to recognize known beacons and/or to interpret new beacons. Help service 122 may use a most recent beacon and/or may use several recent beacons to determine a context. In some embodiments, help service 122 may average the most recent beacon and one or more recent beacons. In other embodiments, help service 122 may determine a weighted average of the most recent beacon and one or more recent beacons, weighing the most recent beacon highest and each other beacon less as the beacons move further back in time, for example. Help service 122 may record the current context in help database 124. Example context features and context-determination processing are described with respect to FIGS. 6-7 below.

At 308, system 100 may deliver context-specific help. For example, help service 122 may continually perform steps 302-306 as a user interacts with the application. When the user requests help, and/or automatically, help service 122 may check the current context in help database 124 and select help (e.g., articles, prompts, tips, etc.) that may be relevant to the current context. For example, help database 124 may include help entries, and each help entry may be tagged with one or more attributes that may be contextually relevant (e.g. topics contained in the help article). In some embodiments, help service 122 may use one or more prediction algorithms to predict useful help entries based on context. Help selection examples are described with respect to FIGS. 8A-8B below.

Figure 4:
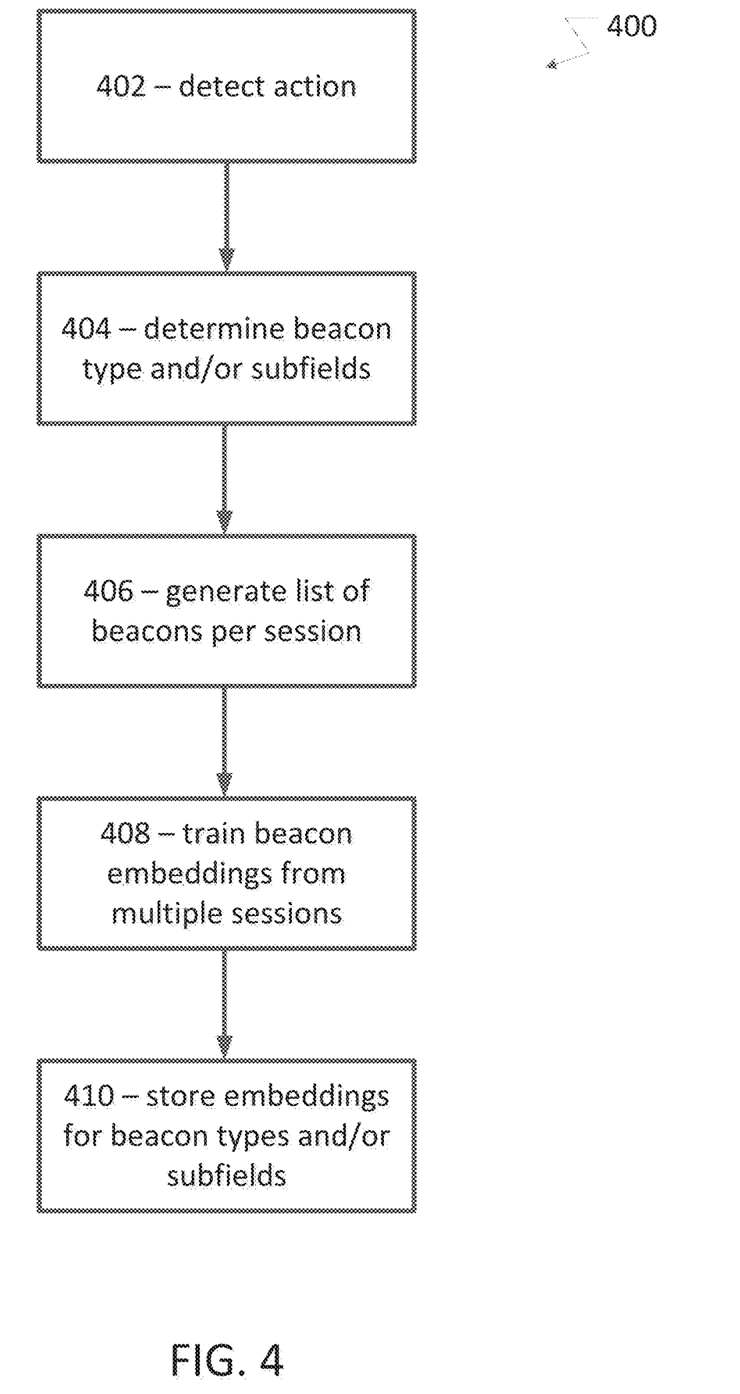
FIG. 4 shows a beacon embedding and/or training process according to an embodiment of the present disclosure.
Figure 5A:
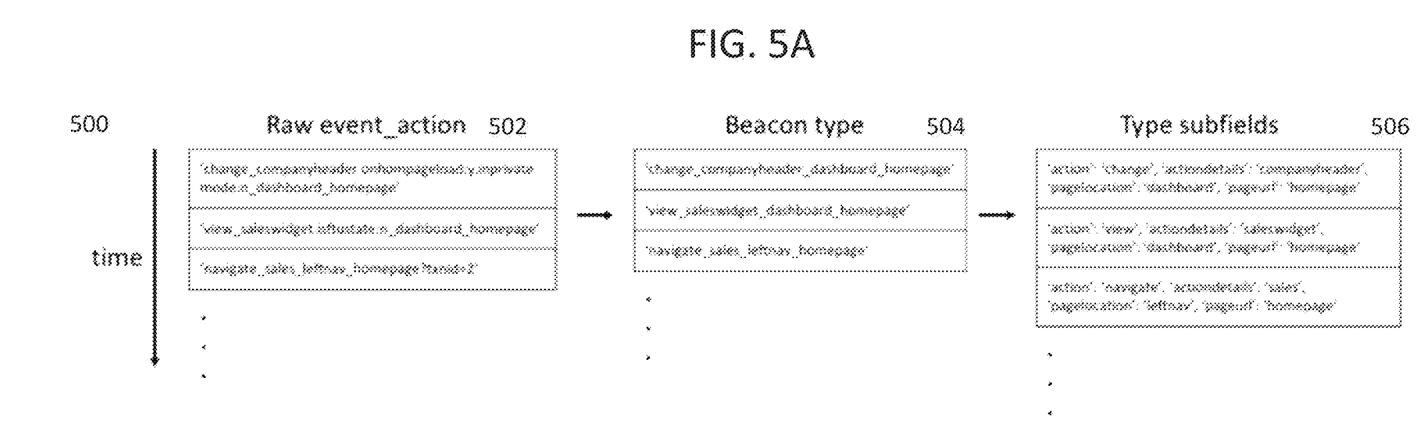
FIGS. 5A-5C show beacon examples according to an embodiment of the present disclosure.
Figure 5B:
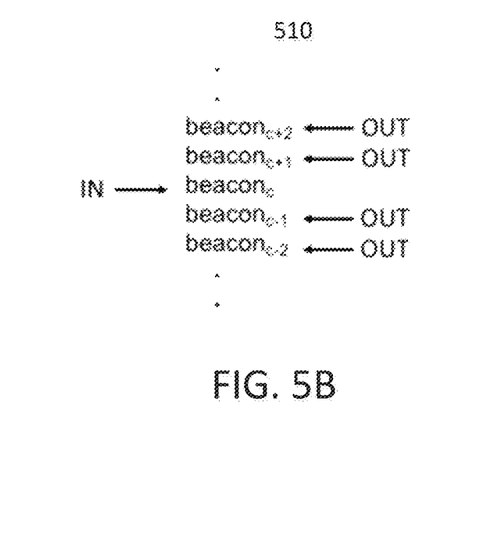
Figure 5C:
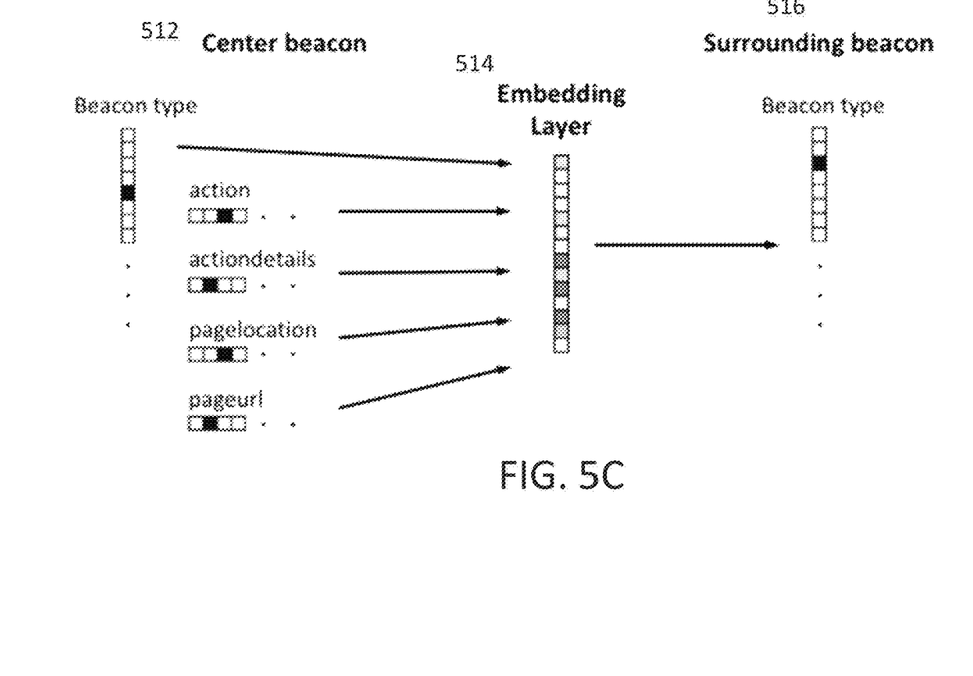

FIG. 4 shows a process 400 for analyzing beacon data and/or training beacon embeddings, and FIGS. 5A-5C show beacon examples 500 and 510, according to an embodiment of the present disclosure. System 100 may perform process 400 to detect and analyze actions by the user interacting with the application and/or to train beacon embeddings based on the user actions. In some embodiments, process 400 may be a subset of process 300. For example, system 100 may perform process 400 to detect actions at 302 and/or to determine action definitions at 304. In some embodiments, system 100 may perform process 400 every time a user performs an action in the application. For example, system 100 may perform process 400 multiple times as part of a machine learning process to generate embeddings used to determine overall context as described below. At 402, system 100 may detect an action performed by a user. For example, help service 122 may record a user interaction with a UI of an application. User interactions may include clicks, entries into fields, hovers, highlights, and/or other selections of UI elements.

At 404, system 100 may determine details about the action detected at 402, such as beacon type and/or subfield details. For example, help service 122 may generate a string of data representing details of the action. FIG. 5A illustrates an example timeline 500 of strings, or beacons, wherein each entry in the timeline may represent a different action for a different user action. Each user session may be represented as a list of beacons ordered by time (e.g., timeline 500). At this stage of process 400, help service 122 may represent the action in terms of raw event_action 502. Raw event_action 502 may include both generic action data and specific transactional data. The generic action data may include, for example, an indication of the action ("action"), action details ("actiondetails"), location on page where UI item was clicked or otherwise interacted with ("pagelocation"), and/or the URL of the page on which the action occurred or other locator of the action within the application ("pageurl"). The specific transactional data may include specific details regarding user history, browser status, other object properties, and/or outcomes of the action. For example, in the first raw event_action 502 item, specific transactional data may include "onhomepageload:y," and "inprivatemode:n." In the second raw event_action 502 item, specific transactional data may include "isftustante:n." In the third raw event_action 502 item, specific transactional data may include "txnid=2."

Help service 122 may parse the raw event_action 502 data into beacon type 504 format by elimination of transactional details. Each beacon type 504 may be associated to a unique combination of subfields (e.g., action, actiondetails, pagelocation, and pageurl). For purposes of illustration, in timeline 500, subfields 506 are shown for each beacon type 504. For example, actions may include change, view, and/or navigate. Actiondetails may include companyheader, saleswidget, and/or sales. Pagelocations may include dashboard and/or leftnav. Pageurls may include homepage. These subfields 506 are presented as examples only, and various implementations of system 100 may utilize these and/or other subfields 506 to generate beacon types 504. Help service 122 may store beacon data for the action in help database 124.

Returning to FIG. 4, at 406, system 100 may generate a list of beacons for a user session, For example, help service 122 may monitor user actions for an entire session of user interaction with the UI and perform analysis at 404 for every action detected at 402. The end result may be a list of beacon data for the entire session stored in help database 124. Over time, as multiple users engage in multiple sessions of interaction, help service 122 may accumulate multiple beacon lists within help database 124.

At 408, system 100 may train beacon embeddings from multiple user sessions. To train the embeddings of each beacon type, help service 122 may use a modified skip-gram algorithm. For example, as shown in FIG. 5B, each center item (in this case, beacon type IN) may be used to predict each of the surrounding items (e.g., other beacon types OUT) that co-occur within a window 510 of specified length from the center item. For every user session that is chosen to be included in the training dataset, this process may iterate over every beacon, treating it as the center item and using it to predict the surrounding items.

In order to perform the training, help service 122 may employ a fully connected neural network with a single hidden layer such as the example shown in FIG. 5C. The analysis 510 may use not only beacon type 504 itself, but also its component parts (e.g., the subfields) as part of input layer 512. Each of the separate (e.g., five) sets of inputs (e.g., beacon type 504 and the component subfields) may be encoded separately as one-hot vectors that together form input layer 512.

In some embodiments, help service 122 may have generated the embeddings 514, for example using machine learning processing. In one specific, but non-limiting, example, training the embeddings 514 may involve a modification of the a word2vec skip-gram algorithm whereby an embedding size range of 100-200 and/or a range of window sizes of 6-10 are selected. Help service 122 may employ a fully connected neural network with a single hidden layer on a large set of clickstream data (e.g., billions of beacons). Each center item (e.g., each beacon type) may be used to predict the surrounding items (e.g., other beacon types) that co-occur within a window of specified length from the center item. Each user session with the application may be considered a single "sentence" of beacons, and model weights may be updated through minimization of the softmax-loss computed on the output layer. The output layer may include the surrounding item's beacon type 516, and in some embodiments only the surrounding item's beacon type 516.

Returning to FIG. 4, at 410, system 100 may compute and store each distinct beacon type 512 and associated embedding 514 via simple activation of the trained weights associated to each beacon type and component subfields. In some embodiments, each distinct beacon type 512 and associated embedding 514 may be stored in help database 124 in a key-value store for fast lookup during model deployment. Each distinct subfield of input layer 512 and associated embedding 514 may also be separately computed and stored in help database 124 in separate key-value stores, in order to enable future computation of previously unseen beacon types.

Figure 6:
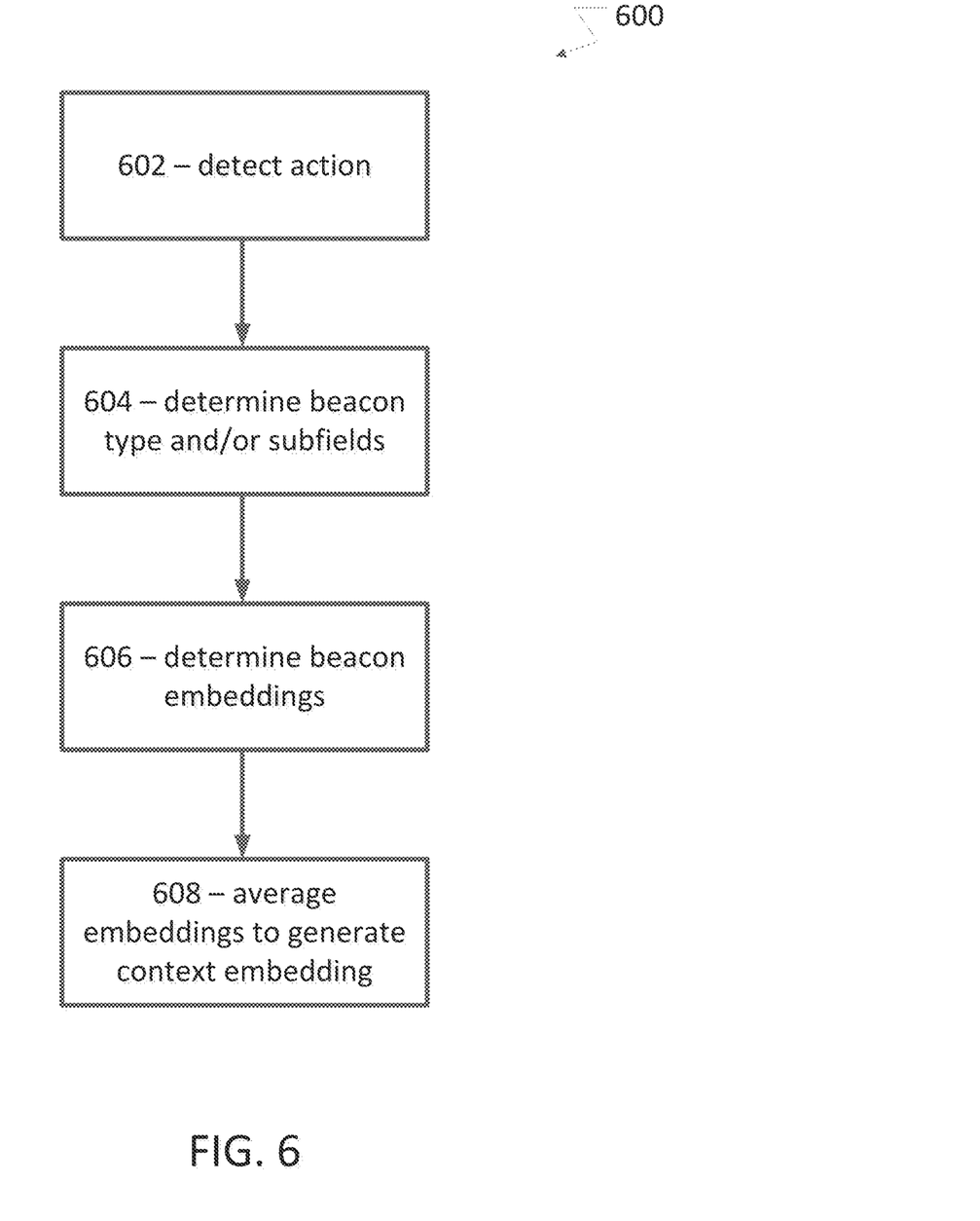
FIG. 6 shows a context determination process according to an embodiment of the present disclosure.
Figure 7:
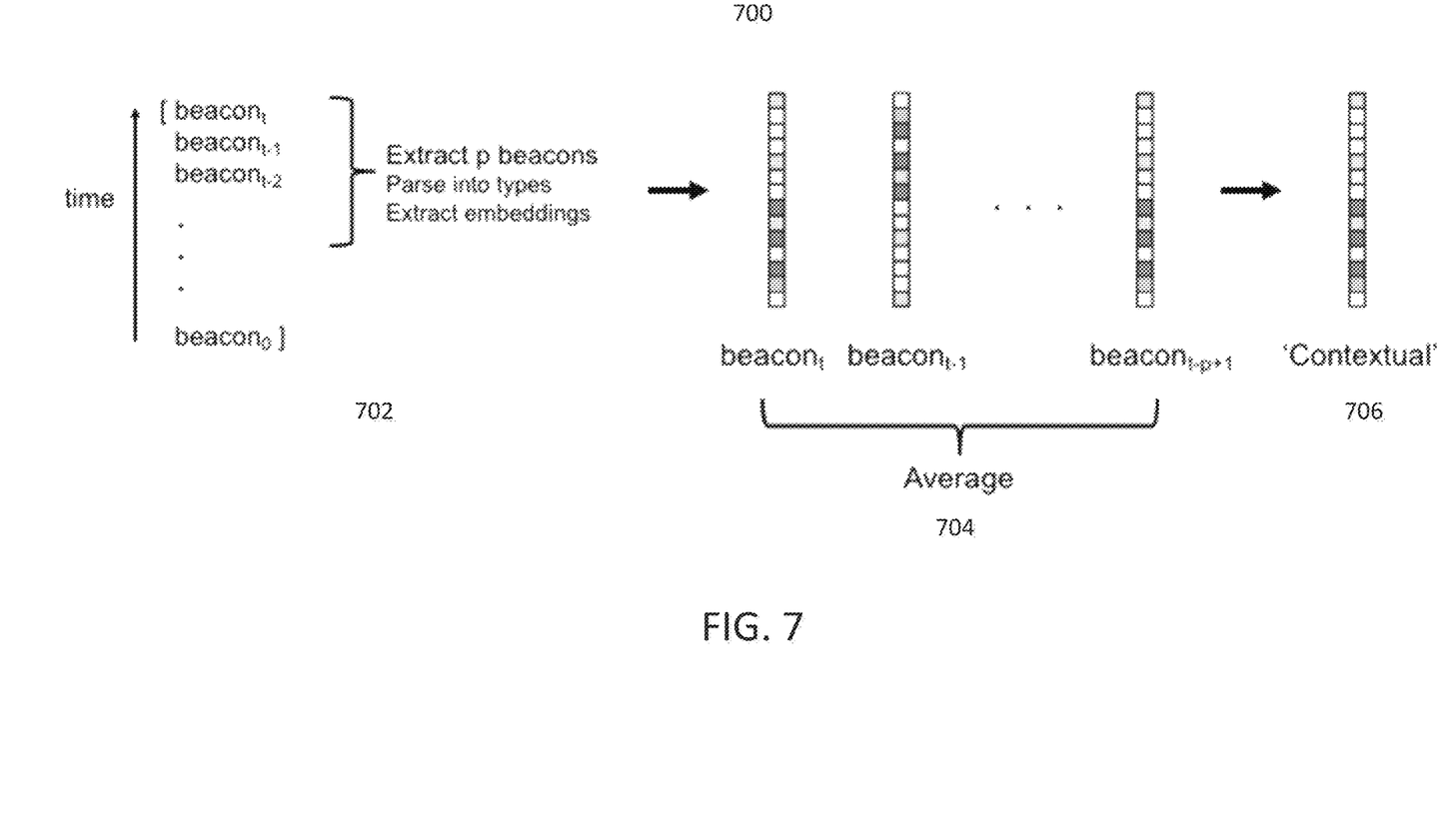
FIG. 7 shows a context determination example according to an embodiment of the present disclosure.

FIG. 6 shows a context determination process 600, and FIG. 7 shows a context determination example 700, according to an embodiment of the present disclosure. System 100 may perform process 600 to determine a context for help suggestions surrounding a user's interactions with an application. In some embodiments, process 600 may be a subset of process 300. For example, system 100 may perform process 600 to generate context at 306 and/or to deliver context-specific help at 308. While process 600 is presented as determining a single context in the following example, system 100 may repeat process 600 for multiple interactions with the application. For example, system 100 may perform process 600 every time the user performs an action in the application in some embodiments.

At 602, system 100 may detect and/or identify a set of most recent user actions while the user is interacting with the application UI. For example, help service 122 may detect actions as in step 402 of process 400, or help service 122 may retrieve the most recent actions from a beacon list stored in help database 124 at step 406 of process 400.

At 604, system 100 may determine beacon type and/or subfields for each of the most recent user actions. For example, system 100 may perform processing similar to that performed at 404 in process 400, resulting in beacon type 504 and/or subfields 506 for each action.

At 606, system 100 may determine embeddings 514 for each of the most recent several beacons. For each of those beacons, help service 122 may process input layer 512 to obtain the precomputed embedding 514 stored in help database 124. For example, help service 122 may retrieve the embedding 514 for beacon type 512 via lookup in the precomputed key-value store. If help database 124 does not contain a precomputed embedding 514 for beacon type 512, help service 122 may generate a new embedding 514 by summing the subfields of input layer 512 and store it, along with beacon type 512, in the key-value store of help database 124. At 608, system 100 may generate a context for the action. FIG. 7 illustrates an example 700. For example, at 702 help service 122 may determine beacon types 504 for each of the most recent several beacons and identify the associated embeddings 514 for the beacon types 504 in help database 124. At 704, help service 122 may average the embeddings 514. Help service 122 may generate a true average in some embodiments. In other embodiments, help service 122 may give greater weight to more recent embeddings 514 than to less recent embeddings 514. Help service 122 may use any weighting scheme to weigh embeddings 514. At 706, help service 122 may arrive at the average (or weighted average) of embeddings 514. Help service 122 may use the average or weighted average of embeddings 514 as the context embedding. In some embodiments, help service 122 may store the context embedding in help database 124, for example to enable the efficient computation and storage of training data to aid in development of additional models described in FIG. 8. In some embodiments, help service 122 may use the context embedding in real time, in order to suggest help to the immediate user of the application.

Figure 8A:
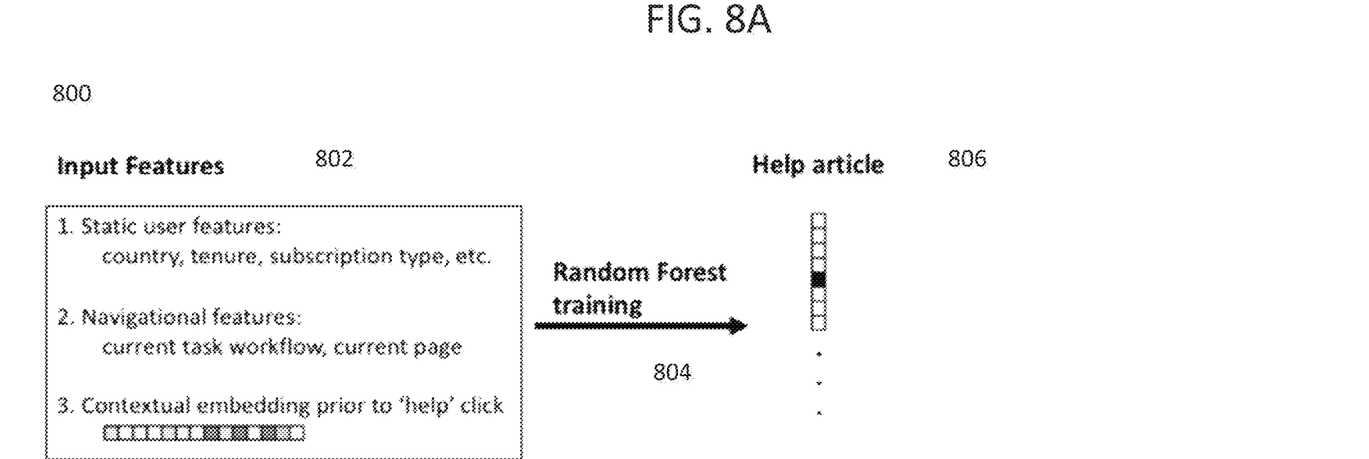
FIG. 8A-8B show help determination examples according to an embodiment of the present disclosure.
Figure 8B:
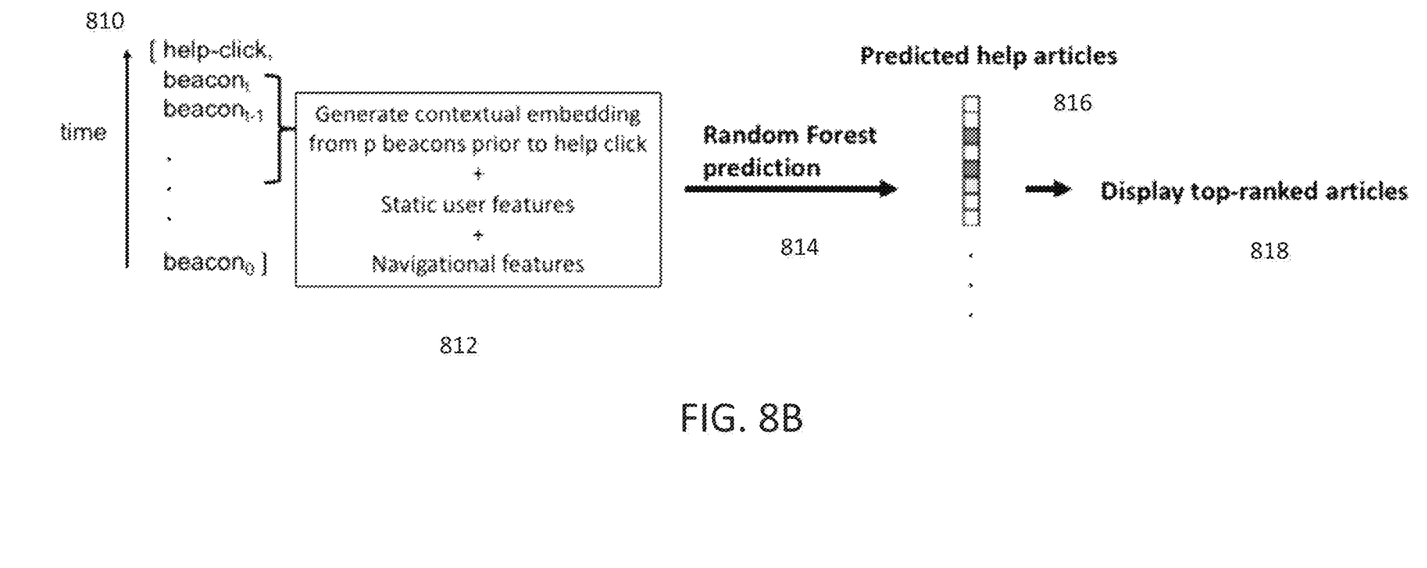

FIG. 8A-8B show help determination examples according to an embodiment of the present disclosure. Specifically, FIG. 8A shows an example help topic training process 800, and FIG. 8B shows an example help topic selection process 810 that may leverage the training results from process 800. Help service 122 may perform training process 800 prior to presenting help (e.g., at 308 in process 300), and/or help service 122 may perform selection process 810 after arriving at a context (e.g., at 608 of process 600) to select potentially useful help information (e.g., at 308 in process 300).

In training process 800, help service 122 may take training inputs at 802. The inputs may include static user features such as the user's location, experience level with the application, application subscription type, and/or other data descriptive of the user that may be suggestive of the user's familiarity with the application. The inputs may include navigation features within the application, such as a workflow for a current task being performed in the application, a current portion of the application being used (e.g., a current page of a web UI for the application or a current view of a mobile app UI), and or other data descriptive of a current application state. The inputs may include a context (e.g., determined as described above in process 600) at the time of a help request.

At 804, help service 122 may analyze the inputs to predict a help topic the user will select. For example, help service 122 may use a random forest or other machine learning algorithm to predict a help topic based on the inputs.

At 806, help service 122 may arrive at a help article prediction, which may be a prediction of one or more help articles relevant to the context. Actual help topics selected by the users may be fed back into the machine learning algorithm to improve predictions. The training process 800 may be repeated in this fashion, analyzing inputs and feeding back help results, for a plurality of help requests by one or more users. Help service 122 may store training results in help database 124.

Help service 122 may use the training results to suggest help by performing help topic selection process 810. In some embodiments, help service 122 may perform help topic selection process 810 in response to receiving a user request for help through the UI.

For example, help service 122 may take contextual inputs at 812. The inputs may include static user features such as the user's location, experience level with the application, application subscription type, and/or other data descriptive of the user that may be suggestive of the user's familiarity with the application. The inputs may include navigation features within the application, such as a workflow for a current task being performed in the application, a current portion of the application being used (e.g., a current page of a web UI for the application or a current view of a mobile app UI), and or other data descriptive of a current application state. The inputs may include a context (e.g., determined as described above in process 600) at the time of a help request. The context may include an average of embeddings 514 as described above.

At 814, help service 122 may compare the inputs with training results from help database 124 that were generated using similar inputs to predict one or more useful help articles. At 816, help service 122 may assemble a set of several possible help articles.

At 818, help service 122 may rank the articles in terms of likely relevance based on the inputs and display one or more help articles. For example, help service 122 may cause UI to show a top ranked article or an ordered list of articles arranged by rank. The user may be able to select an article and obtain help. In some embodiments, the user selection may be fed back into the training algorithm (e.g., as described above with respect to process 800) to help improve future help suggestions.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method of providing context-specific interpretation of a user interaction with a user interface of computer application comprising:
   detecting, by a processor, a user interaction with a user interface (UI);
   analyzing, by the processor, the user interaction to determine a plurality of action details;
   generating, by the processor, a user context based on the plurality of action details and additional context information, wherein the generating the user context includes assembling a beacon embedding by taking each type of the plurality of action details as a separate input;
   selecting, by the processor, at least one operation relevant to the user interaction and context; and
   causing, by the processor, the computer application to perform the operation, wherein:
   generating the user context includes processing the beacon embedding with a plurality of known beacon embeddings stored in a memory in communication with the processor, wherein each of the known beacon embeddings is associated with a known context, and
   generating the beacon embedding includes assembling the beacon embedding from a combination of the plurality of action details taken as a single input.

2. The method of claim 1, wherein the plurality of action details include a type of the action, a detail about the action, a location of the action within a UI page, a location of the UI page, or a combination thereof.

3. The method of claim 1, wherein generating the user context includes:
   processing the beacon embedding with a plurality of known beacon embeddings stored in a memory in communication with the processor, wherein each of the known beacon embeddings is associated with a known context.

4. The method of claim 3, wherein generating the beacon embedding includes assembling the beacon embedding from a combination of the plurality of action details taken as a single input.

5. The method of claim 3, further comprising creating, by the processor, the plurality of known beacon embeddings.

6. The method of claim 5, wherein the creating includes analyzing a plurality of historical action details with a machine learning algorithm.

7. The method of claim 1, wherein generating the user context includes:
   retrieving a plurality of previously-generated beacon embeddings for a user session including the user interaction stored in a memory in communication with the processor; and
   averaging the beacon embedding and the plurality of previously-generated beacon embeddings to generate an averaged beacon embedding.

8. The method of claim 7, wherein generating the user context includes processing the averaged beacon embedding with a plurality of known beacon embeddings stored in the memory, wherein each of the known beacon embeddings is associated with a known context.

9. The method of claim 7, wherein the averaging is a weighted averaging giving more weight to the beacon embedding than is given to at least one of the plurality of previously-generated beacon embeddings.

10. The method of claim 1, wherein the selecting of the at least one operation includes selecting at least one help topic and the causing of the computer application to perform the operation includes causing the UI to display the at least one help topic.

11. The method of claim 10, wherein the selecting of the help topic includes:
   comparing a beacon embedding based on the plurality of action details with a plurality of known beacon embeddings stored in a memory in communication with the processor, wherein each of the known beacon embeddings is associated with at least one of a plurality of available help topics; and
   selecting the help topic from among the at least one of a plurality of available help topics associated with a known beacon embedding that is similar to the beacon embedding.

12. The method of claim 11, further comprising associating, by the processor, each of the known beacon embeddings with the at least one of the plurality of available help topics.

13. The method of claim 12, wherein the associating includes analyzing a plurality of historical user contexts and historical help selections with a machine learning algorithm.

14. The method of claim 10, wherein the help topic is selected based on the user context and at least one additional input.

15. The method of claim 14, wherein the at least one additional input includes a characteristic of the user, a characteristic of the UI, or a combination thereof.

16. A system for providing context-specific interpretation of a user interaction with a user interface of a computer application comprising: a memory configured to store a plurality of help topics; and a processor in communication with the memory and a user interface (UI), the processor configured to: detect a user interaction with the UI; analyze the user interaction to determine a plurality of action details; generate a user context based on the plurality of action details and additional context information, wherein the generating the user context includes assembling a beacon embedding by taking each type of the plurality of action details as a separate input; select at least one operation relevant to the user interaction and context from the memory; and cause the computer application to perform the operation wherein:
   generating the user context includes processing the beacon embedding with a plurality of known beacon embeddings stored in a memory in communication with the processor, wherein each of the known beacon embeddings is associated with a known context, and
   generating the beacon embedding includes assembling the beacon embedding from a combination of the plurality of action details taken as a single input.

17. The system of claim 16, wherein the plurality of action details include a type of the action, a detail about the action, a location of the action within a UI page, a location of the UI page, or a combination thereof.

18. The system of claim 16, wherein the processor is configured to generate the user context by
   processing the beacon embedding with a plurality of known beacon embeddings stored in the memory, wherein each of the known beacon embeddings is associated with a known context.

19. The system of claim 18, wherein the processor is configured to generate the beacon embedding by performing processing including assembling the beacon embedding from a combination of the plurality of action details taken as a single input.

20. The system of claim 18, wherein the processor is further configured to create the plurality of known beacon embeddings.

21. The system of claim 20, wherein the processor is configured to create the plurality of known beacon embeddings by performing processing including analyzing a plurality of historical action details with a machine learning algorithm.

22. The system of claim 16, wherein the processor is configured to generate the user context by performing processing including:
   retrieving a plurality of previously-generated beacon embeddings for a user session including the user interaction stored in the memory; and
   averaging the beacon embedding and the plurality of previously-generated beacon embeddings to generate an averaged beacon embedding.

23. The system of claim 22, wherein the processor is configured to generate the user context by performing processing including processing the averaged beacon embedding with a plurality of known beacon embeddings stored in the memory, wherein each of the known beacon embeddings is associated with a known context.

24. The system of claim 22, wherein the averaging is a weighted averaging giving more weight to the beacon embedding than is given to at least one of the plurality of previously-generated beacon embeddings.

25. The system of claim 16, wherein the processor selects the at least one operation by selecting at least one help topic and the processor causes the computer application to perform the operation by causing the UI to display the at least one help topic.

26. The system of claim 25, wherein the processor is configured to select the help topic by performing processing including:
   comparing a beacon embedding based on the plurality of action details with a plurality of known beacon embeddings stored in the memory, wherein each of the known beacon embeddings is associated with at least one of a plurality of available help topics; and
   selecting the help topic from among the at least one of a plurality of available help topics associated with a known beacon embedding that is similar to the beacon embedding.

27. The system of claim 26, wherein the processor is further configured to associate each of the known beacon embeddings with the at least one of the plurality of available help topics.

28. The system of claim 27, wherein the processor is configured to associate each of the known beacon embeddings with the at least one of the plurality of available help topics by performing processing including analyzing a plurality of historical user contexts and historical help selections with a machine learning algorithm.

29. The system of claim 16, wherein the help topic is selected based on the user context and at least one additional input.

30. The system of claim 29, wherein the at least one additional input includes a characteristic of the user, a characteristic of the UI, or a combination thereof.

31. A method of providing context-specific interpretation of a user interaction with a user interface of computer application comprising: detecting, by a processor, a user interaction with a user interface (UT); analyzing, by the processor, the user interaction to determine a plurality of action details; generating, by the processor, a user context based on the plurality of action details and additional context information, wherein the generating the user context includes generating a beacon embedding via a machine learning process; selecting, by the processor, at least one operation relevant to the user interaction and context; and causing, by the processor, the computer application to perform the operation wherein:

generating the user context includes processing the beacon embedding with a plurality of known beacon embeddings stored in a memory in communication with the processor, wherein each of the known beacon embeddings is associated with a known context, and generating the beacon embedding includes assembling the beacon embedding from a combination of the plurality of action details taken as a single input.

\* \* \* \* \*